(12) United States Patent
Despres

(10) Patent No.: US 7,773,619 B2
(45) Date of Patent: Aug. 10, 2010

(54) DEVICE FOR SHARED MANAGEMENT OF A RESOURCE AMONG SEVERAL USERS

(75) Inventor: Rémi Despres, Levallois-Perret (FR)

(73) Assignee: Streamcore, Gennevilliers (FR)

( * ) Notice: Subject to any disclaimer, the term of this patent is extended or adjusted under 35 U.S.C. 154(b) by 1881 days.

(21) Appl. No.: 10/691,879

(22) Filed: Oct. 23, 2003

(65) Prior Publication Data

US 2004/0199915 A1 Oct. 7, 2004

Related U.S. Application Data

(63) Continuation of application No. 09/555,717, filed as application No. PCT/FR98/02511 on Nov. 24, 1998, now abandoned.

(30) Foreign Application Priority Data

Dec. 3, 1997 (FR) .................................. 97 15237

(51) Int. Cl.
  *H04L 12/28* (2006.01)
  *H04L 12/56* (2006.01)
  *G06F 7/38* (2006.01)
  *G06F 9/00* (2006.01)
  *G06F 9/44* (2006.01)
(52) U.S. Cl. ..................... 370/412; 370/395.4; 712/225
(58) Field of Classification Search .................. 370/412
  See application file for complete search history.

(56) References Cited

U.S. PATENT DOCUMENTS 6,088,734 A * 7/2000 Marin et al. ................. 709/232

6,295,285 B1 * 9/2001 Whitehead .................. 370/329
6,442,166 B1 * 8/2002 McDonald et al. ..... 370/395.42

FOREIGN PATENT DOCUMENTS

EP 0 734 195 A2 9/1996
WO WO91/08628 6/1991

OTHER PUBLICATIONS

R. Despres, "A packet switching network with graceful saturated operation", International Conference and Computer Communications 345-351, 1972.
R. Despres et al, "Algorithm for allocating central processing unit for computers operated in time sharing mode, ",Annales des Telecommunication, p. 19-30, 1972.

* cited by examiner

*Primary Examiner*—William Trost, IV
*Assistant Examiner*—Andrew Chriss
(74) *Attorney, Agent, or Firm*—Christie, Parker & Hale LLP

(57) ABSTRACT

The device comprises a memory (3) for storing several user share parameters and several amounts capable of advancing. A decision means (6) allocates a chosen service slice of the resource to a user selected as possessing the least advanced amount. It subsequently advances his amount according to a chosen increment. A memory link means (5) defines user queues of "FIFO" type, such that the user having the least advanced amount in a queue appears at the head of this queue. According to the invention, the memory (3) stores a limited number of values of increments. The memory link means (5) associates one of these values of increments with each user and allocates an increment value to each queue.

11 Claims, 2 Drawing Sheets

| USERS | FIFOS |
|---|---|
| u<br>D(u)<br>nd(u)<br>pV(u) | P(c)<br>F(c)<br>u(c)<br>e(c) |
| MANAGER<br>V, Qmax ||

FIG. 3a

| USERS | "NEW" FIFOS | "OLD" FIFOS |
|---|---|---|
| u<br>D(u)<br>Q(u)<br>C(u)<br>F(u)<br>a(u)<br>s(u) | P(c)<br>pun(c)<br>dun(c)<br>Fn(c) | P(c)<br>pua(c)<br>dua(c)<br>Fa(c)<br>ea(c) |
| MANAGER<br>V, Qmax, Dmax |||

FIG. 3b

DEVICE FOR SHARED MANAGEMENT OF A RESOURCE AMONG SEVERAL USERS

CROSS-REFERENCE TO RELATED APPLICATION(S)

This application is a continuation of U.S. application Ser. No. 09/555,717, filed Jun. 2, 2000, now abandoned which is a National Phase Patent Application of International Application No. PCT/FR98/02511, filed on 24 Nov. 1998, which claims priority of French Patent Application No. 97/15237, filed 3 Dec. 1997.

SUMMARY OF THE INVENTION

The invention relates to the allotting of a computer resource such as a data transmission link or a processing unit. More particularly, it relates to a device for managing the sharing of this resource between several users.

The function of a device of this type is in particular to select one user from among at least some of the using users. The resource then provides a predetermined service amount for this user. In practice, the service amount is allotted successively to the selected users, in limited service slices (or quanta), for example, by timesharing processing or by packet transmission.

Each user possesses an entitlement to the resource, which may be represented by a share quota or "share parameter", associated with this user. Thus, in the case of a sharing of the resource between several requesting users, the share parameter of a user may afford him a relative priority with respect to the other users.

However, the management of the resource must take account of factors related to allocation timescales. Thus, a device of the aforesaid type associates an amount representative of a progression with each user. This progression amount (represented as a virtual deadline), is capable of increasing with each allocation of the resource for this user, like a counter of slices of service rendered. In practice, the resource is allocated to one of the requesting users whose progression amount is the least advanced. A conventional processing consists in comparing the progression amounts of all the requesting users. When the number of users requesting is considerable, this comparison induces forthwith a prohibitive timescale with regard to the allocations.

In one of his earlier works, the Applicant has proposed a device capable of grouping the users by classes, according to a predetermined class criterion. These classes are constructed as queues of "first in-first out" (FIFO) type in such a way that the user of least advanced progression amount in each queue appears at the head of this queue. Thus, the aforesaid comparison of the progression amounts is performed over a restricted number of head of queue users. Interesting, this solution nevertheless retains various drawbacks. Indeed, to perform such a grouping, it is necessary to impose a class criterion on each user. Thus, the criterion chosen here consists in imposing a share parameter and a quantum on each user, on initializing the processing. The users are then distributed into queues so that each queue is associated with a share parameter and quantum pair. In this case, although the processing timescales are reduced, there is no independence of the share parameters associated with the users and of the quanta allocated thereto.

An embodiment of the invention aims to improve the situation. For this purpose, it proposes a class criterion which, on the one hand, imposes only a single quantity for defining these classes, and on the other hand, makes it possible to retain an independence of the share parameters associated with the users.

An embodiment of the invention then starts from a device comprising a work memory, a decision means (forming part, for example, of a central processing unit) for allocating chosen service slices of the resource, and a memory link means playing the role of interface between this memory and the decision means.

The memory is configured to store user identifiers, as well as several share parameters, and several progression amounts capable of advancing. The processing unit then allocates a service slice to a user selected as possessing the least advanced progression amount, doing so in a set comprising at least some of the users. It subsequently advances the progression amount of this selected user according to a chosen increment. Finally, with each user identifier, the memory link means associates the share parameter of this user and his progression amount, while defining user queues of the "first in-first out" (FIFO) type, such that the identifier at the head of a queue always designates the user having the least advanced progression amount in this queue.

According to one embodiment of the invention, the work memory stores in addition a limited number of values of increments. The memory link means then associates one of these values of increments with each user and defines the queues on the basis of the values of increments in limited number. Finally, the processing unit allocates the selected user a service slice associated with a pair represented by its share parameter and the increment of its queue, according to a predetermined rule. Thus, the class criterion is, according to an embodiment of the present invention, defined on the basis of a single type of parameter, corresponding to the queue increments.

According to an optional characteristic of the invention, the said predetermined rule comprises the fact that the service slice allocated to a selected user, is dependent on the product of its share parameter times the increment of its queue.

According to another advantageous optional characteristic of the invention, the memory stores, in addition, an overall progression amount capable of advancing. The processing unit then advances, with each allocation of the resource, this overall progression amount according to a chosen overall increment. The processing unit is configured so as to deny any allocation of resource to a user so long as the overall progression amount that is advanced is less than the amount allocated to this user. This technique makes it possible in particular to avoid allocating the resource to a user who would not be in a position to use it.

The processing unit defines, with each allocation of the resource to a user, an overall increment. The increment is derived, preferably, from the queue increment of this user and weighted in such a way that the advance of the overall progression amount remains representative of the amounts of services successively allocated.

The memory comprises a "queues" area in which are inscribed, for each queue, its increment and the identifier of its head user. It also comprises a "users" area in which are inscribed, for each user, his identifier, his share parameter, as well as an end of queue item. In practice, this item is defined, for each user, by a "last" or "non-last" state of the queue.

According to a first embodiment of the invention, the number of users to be taken into account is considered to remain constant during the processing.

The memory link means then defines the said queues in the guise of circular lists (cyclic queues of the "first in-first out" type). Such an arrangement of the queues makes it possible to manage just a single progression amount per queue. Thus, the memory link means associates only a single progression amount with the users of one and the same list, and the "queues" area of the memory comprises one progression amount for each list.

The processing unit allocates service slices to the users of the list of least advanced progression amount. It advances the progression amount of this list after allocating a service slice to the end of list user. In practice, the processing unit allocates service slices from the user at the head of the list down to the user at the end of the list, so long as the users of this list remain able to use the resource.

According to a second more elaborate embodiment, the number of users to be taken into account is considered to be able to vary during the processing.

Thus, each user is capable of requesting or not requesting a service slice of the resource. The device then comprises an input/output link, configured so as to distinguish the requesting users from the users who are no longer requesting the resource.

Moreover, the memory link means cooperates with this input/output link so as to define distinct queues of newly requesting users and of formerly requesting users (already waiting for the resource since the last allocation). The memory link means is thus able to assign the new entrants an progression amount established with respect to a chosen quantity. In practice, this quantity must relate to the advance of the allocations, such as the aforesaid overall progression amount.

As far as the users who have become non-requesters are concerned, the memory link means is configured so as to keep them in their queue so long as they do not appear at the head of the queue. It then cooperates with the processing unit so as to eliminate from a queue a non-requesting user appearing at the head of this queue. In practice, this elimination relates to non-requesting users, possessing the least advanced progression amount from among those amounts of the users appearing at the head of the queue and who are authorized to use the resource. Thus, the memory link means does not have to search, during processing, for a user who has become a non-requester in the various queues, something which would incur the risk of retarding or, more generally, of disturbing the tempo of the allocations.

BRIEF DESCRIPTION OF THE DRAWINGS

Other characteristics and advantages of the invention will become apparent on examining the detailed description herein below, the appendices and the appended drawings in which.

Written out in Appendix I are the processing performed by the device according to the first aforesaid embodiment, as well as the notation used for this processing.

Written out in Appendix II are the processing performed by the device according to the second aforesaid embodiment, as well as the notation employed.

Written out in Appendix III is an element of the processing envisaged on initialization, making it possible to construct the user queues.

Finally, written out in Appendix IV are the formulae of the current text, which are represented by a numeral between parentheses.

The drawings and the appendices contain, in essence, elements of definite character. They will therefore be able to serve not only to better elucidate the description, but also to contribute to the definition of the invention, as appropriate.

DETAILED DESCRIPTION

The documents forming part of the prior art, and cited hereinbelow, are analysed with the same terminology as that used to describe the present invention. This gives rise to an interpretation which may go beyond the objective content of the said documents, in the eyes of the person skilled in the art who is not yet cognisant of the invention.

Figure 1:
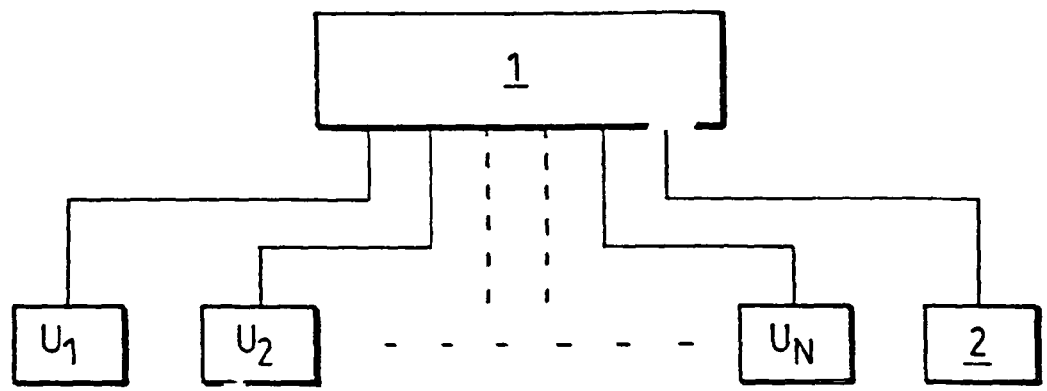
FIG. 1 diagrammatically illustrates the interactions between the resource, the resource manager device and N users $u_1, u_2, \ldots, u_N$ (or user entities), FIG. 2 diagrammatically illustrates the interactions between various elements which make up the device, and the N user entities, FIG. 3a diagrammatically represents the functional structure of the work memory of the device according to a first embodiment of the invention, and FIG. 3b diagrammatically represents the functional structure of the work memory of the device according to a second embodiment of the invention.

Reference is firstly made to FIG. 1 in which a resource 1, such as a data transmission link or a central processing unit, is shared between a number N of user entities, $u_1, \ldots, u_N$, for example, between N computer applications or N communications in network nodes. A device 2 for managing the resource 1 assigns the latter in service amounts to successively selected user entities. Each allocation of service to a user entity $u_i$ is made for a chosen service amount: the quantum $Q_i$ of this allocation. The user entity may or may not consume the whole of this quantum.

Figure 2:
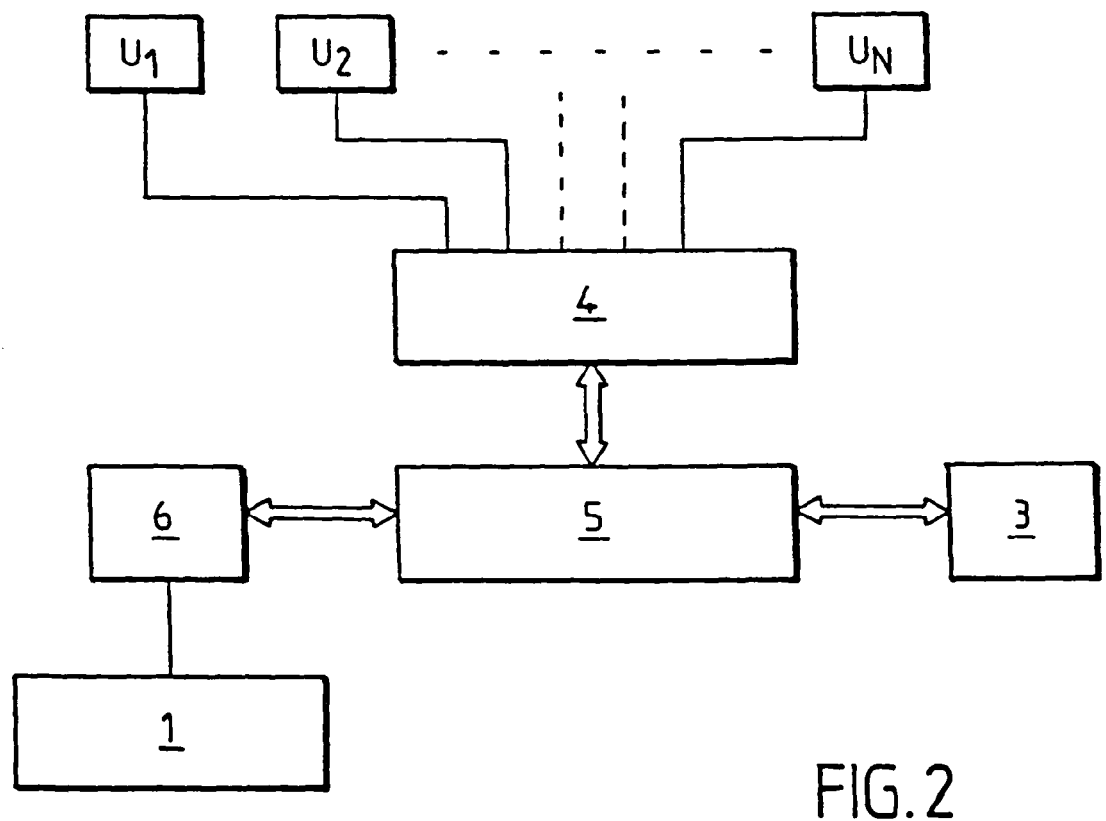

The device, such as it appears in FIG. 2, for managing the resource 2 comprises an input/output link 4, for example a bus for communicating with the N user entities. It additionally comprises a work memory 3, in which are recorded in particular data relating to the user entities $u_1, \ldots u_N$, as well as a memory link means 5, such as a memory interface between the input/output link 4 and the memory 3. Finally, the device described comprises a decision means 6 (forming part, for example, of a central processing unit), capable in particular of selecting one of the entities so that the resource is assigned to it.

In the example described, the management of the resource is performed in time-sharing mode, under the constraint of complying with a fairness of sharing between the N user entities. Thus, the quantum $Q_s$ of each allocation corresponds to a service duration relating to the execution of a task by the resource, for a selected entity $u_s$. In order to comply with a fairness of sharing between the user entities, a share parameter associated with each entity according to criteria external to the resource manager device 2, is recorded in the work memory 3. In the case of time-sharing management, these share parameters (or nominal throughputs) are proportional to desired mean speeds of execution for each entity. Thus, the resource manager 2 must allocate service amounts $Q_i$ to a user entity $u_i$, which, when they are aggregated over any durations, are at best proportional to his nominal throughput parameter D(i). The resource load $\gamma(t)$, as a function of time t and for N user entities $u_1, \ldots, u_N$, can then be defined by relation (1), given in Appendix IV of the present application.

To ensure high-performance management of the resource, one generally seeks to limit the delay possibly taken, for each user entity, by the aggregating of the quanta actually allocated thereto. This delay (or processing time) is estimated with respect to an ideal allocation, strictly proportional to the nominal throughput of the entity. It is evaluated over durations for which the user entity remains permanently able to use the resource. On the other hand, this delay scarcely has any meaning over the possible periods during which the user entity ceases to be a requester.

In one of his earlier works described by the document:

[1]—"Algorithme d'allocation d'unit centrale pour calculateurs exploits en temps partag" [Algorithm for allotting central processing unit for computers operated in time-sharing mode] (R. Desprs and A. Bache, *Annales des Télécommunications*, p. 19, 1972), the Applicant proposes a model for time-sharing resource management which is based on parallel processing of the user entities. The resource is allotted alternately in respect of tasks currently being executed, demanding a processing equivalent to the complete possession of the resource during a quantum time Q. Thus, the larger the number of requesting user entities, the slower each task is executed.

For each newly requesting user entity $u_i$, the date $d_i(t)$ of its last request for a quantum $Q_i(t)$ at the instant t, is known. On the basis of the quantum $Q_i(t)$, it is possible to evaluate the future date $f_i(t)$ at which the quantum requested $Q_i(t)$ will be fully executed, if however one knows how the load $\gamma(t)$ of the resource changes over time. Indeed, $f_i(t)$ is related to $Q_i(t)$ by relation (2) given in Appendix IV.

In order to circumvent the variations in the resource load $\gamma(t)$, a virtual-time scale is preferably used. In practice, this is the real time retarded by the resource load. A virtual date at the instant t is then defined by relation (3) of Appendix IV, in which $t_0(t)$ corresponds to the last instant t at which the load $\gamma(t)$ is zero.

In this virtual-time scale, it is possible to estimate an end of execution deadline for a quantum $Q_i(t)$, defined by relation (4) (Appendix IV).

The Applicant then shows that the virtual deadline $E_i(t)$, estimated for a user entity $u_i$, can be written as a function of his nominal throughput $D_i$ and of the requested quantum $Q_i$, through relation (5) (Appendix IV). The additive term $Q_i/D_i$ thus corresponds to a progression of the virtual deadline $E_i$ of entity $u_i$, from one waiting for a quantum to the next. More generally, the processing operates in such a way that with each allocation of the resource to an entity $u_i$, a progression amount associated with this entity, and represented here by its virtual deadline $E_i$, advances by a chosen increment $dE_i$, equivalent to the ratio $Q_i/D_i$.

Since the virtual time appears as a strictly increasing function of real time, it is possible to envisage, for several requesting user entities, an order for the purposes of executing their respective quanta, under parallel processing.

So as to limit the delays (or "jitter") which may be experienced by the entities with respect to a strict proportionality to the nominal throughputs, it is necessary to define in addition an eligibility state, associated with each user entity, and dependent on a comparison of its virtual deadline with a virtual point in time V overseen by the resource manager. In practice, this involves tagging the user entities which, provisionally, may not use the resource (those which are ineligible), this being conveyed by a further condition related to a "temporizing" state, described in the document [1].

The resource manager then allocates a quantum to the eligible user entity $u_s$ with the closest virtual deadline (the smallest of the virtual deadlines).

However, this resource management under parallel processing of N user entities requires, between each quantum allocation, a processing time which grows with the number of entities N. Furthermore, if the N user entities become eligible at the same virtual point in time, this processing time becomes proportional to the number of entities N.

One of the goals to be achieved is then to arrange matters such that, between each quantum allocation, the processing time required by the resource manager to select an entity, is independent of the number N of user entities.

The Applicant has then proposed in the document:

[2]—"A packet switching network with graceful saturated operation" (R, Desprs, *International Conference and Computer Communications*, p. 345, 1972), a process which is based on the management of a limited number of user entity queues. These queues are of the "first in-first out" (FIFO) type. In this document, the resource manager imposes values of standard "nominal throughput/quantum" pairs on the user entities. Each FIFO corresponds to a standard "nominal throughput/quantum" pair value.

The resource manager oversees a virtual point in time, thus making it possible to manage the user entities through FIFOs, by calculating a virtual deadline progression, and a virtual deadline for each FIFO. An eligibility state is thus determined for each FIFO. The resource manager allocates a quantum to the user entity appearing at the head (the oldest user entity) of the eligible FIFO, whose virtual deadline is closest.

Through this process, the mean processing time no longer grows with the number N of user entities, but only with the number of FIFOs, which is constant with respect to the number of user entities N.

However, this type of manager has the drawback of imposing a limited number of values of nominal throughputs and quanta on the user entities. Since the independence of the nominal throughputs is no longer complied with, the device described in the document [2] does not guarantee fairness of sharing, in the strict sense, between the entities.

The technique described in the document [1] and aiming to compare the virtual deadlines of the user entities having regard to their state of eligibility, guarantees fair sharing. In addition, it makes it possible to obtain independence of the quanta and of the nominal throughputs. To arrange matters such that, with this technique, the processing time required by the resource manager to select a user entity be independent of the number of entities N, the approach which consists in grouping them into a limited number of FIFOs is advisable a priori. With the upgrading of the performance of present-day applications ("Internet" networks, etc.), it is important to circumvent the constraint imposed by the resource manager with respect to the choice of the nominal throughputs of the entities.

The goal accordingly to a an embodiment of the invention is simultaneously to achieve the two objectives of independence of the nominal throughputs and of constant processing times.

The resource manager according to an embodiment of the invention is based on virtual deadline comparison and on eligibility states of FIFOs. However, these FIFOs are constructed as follows:

a)—values of increments in limited number, or of progressions of virtual deadlines (or periods P(c)) in the example described, are imposed by the resource manager, b)—each value of period P(c) characterizes a FIFO (or class c), and c)—each user entity u is assigned to a class such that its calculated virtual deadline progression Q(u)/D(u) corresponds, by default, to the period P(c) of this class.

In the example described, the virtual deadline progression can be calculated from the ratio of the quantum Q(u) to the nominal throughput $D(u)$ of each user entity u. Thus, each user entity is assigned to a class of period $P(c)$ such that the quantum which results from the formula $Q(u)=P(c)*D(u)$ is compatible with the maximum desired delay for this entity.

This assignment is based on a technique which consists in searching for a quantum which, while being less than the order of magnitude desired for this delay, is as large as possible. The processing provided for this purpose is written out in Appendix I of the present application, and is executed on initializing the principal processing operations (Appendices II and III).

Considering n user entities with identifiers $u=1, \ldots, u=n$ presenting a first quantum request at a time $t_0$ (initialized to 0), the resource manager device according to an embodiment of the invention evaluates a ratio of the authorized maximum quantum Qmax to its nominal throughput $D(u)$ for each entity. If all the classes are indexed from 1 to m, and of respective, ascending, periods $P(1), \ldots, P(m)$, the user entity whose ratio of its quantum to its nominal throughput is such that $P(c) \geq Qmax/D(u) < P(c+1)$ is assigned to the class of period $P(c)$.

The various classes are defined in the guise of FIFOs. The resource manager allocates a quantum $Q(u)=P(c)*D(u)$ to the user entity u appearing at the head of the FIFO of period $P(c)$ and whose virtual deadline $F(u)$ is the smallest among those for the user entities appearing at the head of their FIFO.

However, the resource manager must avoid allocating quanta to user entities which, provisionally, may not use the resource (ones which are ineligible). A conventional approach consists in monitoring the instant at which the virtual point in time V of the resource manager reaches the closest virtual deadline among those for the user entities awaiting re-eligibility.

If the number of requesting user entities remains fixed, as does their nominal throughput and their quantum, all the user entities of the same class can remain synchronized. Thus, the continuation of their virtual deadline can be strictly the same. It is sufficient to manage one virtual deadline variable for each class, rather than for each user entity.

According to a first embodiment of the present invention, the FIFOs are defined in the guise of circular lists, with an end of list item associated, in the example described, with each user entity of a list ("non-last of the list" flag) (nd(u)). The memory link means 5 of the resource manager, defines a single virtual deadline $F(c)$ per list c of period $P(c)$. The processing unit 6 selects the list of smallest virtual deadline. After the allocating of the resource to the end of list entity (nd(u)="false"), the processing unit 6 causes the virtual deadline $F(c)$ of this list to progress by an increment equivalent to its period $P(c)$.

The resource is allocated through quanta which are dependent on the nominal throughput associated with each entity of the list, according to the expression $Q(u)=D(u)*P(c)$.

The equivalent detailed processing is written out in Appendix II of the present application. It re-uses, by way of example, the principle of operation of the device according to the first embodiment of the invention.

In the example, the nominal throughputs, the requested quanta and the number n of user entities remain fixed.

A structure according to a "user entities" area and a "FIFOs" area of the work memory 3 is represented in FIG. 3a. The "user entities" area features, for each entity, an identifier u, its nominal throughput D(u), as well as an end of queue item: attribute nd(u). The "FIFOs" area features, for each list, its period $P(c)$, its virtual deadline $F(c)$ and the identifier of the head entity u(c).

On initializing the resource manager, the load of the resource is zero, and the virtual point in time, denoted V, is equal to 0 ($q(t_0)=0$). It evolves subsequently like an integer variable modulo $2^p$, where p is, for example, a word length ($p \in N^*$).

The resource manager allocates each entity an imposed default value of virtual deadline progression. Each entity is then assigned to a class of period corresponding to this imposed value of its virtual deadline progression. In each class, the user entities are ranked in input order (FIFO). In practice, this order can be fixed arbitrarily within each circular list, on initialization. The virtual deadlines, denoted $F(c)$, of each class are initialized to 0. The eligibility states, denoted $e(c)$, of the classes are initialized to "False".

With each allocation, the processing initializes the number, denoted nE, of eligible classes to 0. The minimum deadline, denoted FmI, of the ineligible user entities is initialized to $FmI=V+2^{(p-1)}-1$. This value is necessarily greater than any possible value of the virtual deadline of a user entity. It is thus greater than V, but by a gap which is less than the next maximum positive integer.

This processing takes into account the eligible classes and the ineligible classes. However, it can still be simplified if the progressions of the virtual point in time $pV(u)$ which are associated with the user entities are exact integer numbers. This is because, in this case, it is impossible for all the user entities to be ineligible with a deadline greater than the virtual point in time. Thus, the commands intended for processing this situation can be discarded: the second part of line (1) ($FmI=V+2^{(p-1)}-1$), line (7), and line (12) of the processing.

Lines (2) and (3) of the processing demand that, if, for a class of ineligible entities, the virtual deadline of the class has exceeded the virtual point in time, this class becomes eligible and its virtual deadline progresses by a quantity equivalent to its period $P(c)$.

Lines (4), (5) and (6) demand that, if for any eligible class, the number of eligible classes equals "1" or if the virtual deadline of the class is the smallest of the virtual deadlines of the eligible classes, then the class considered is selected and the minimum deadline of the eligible classes becomes the virtual deadline of this class.

Line (8) then signifies that the selected user entity corresponds to the head of the FIFO of the class selected at the end of the comparison on the m classes.

The quantum $Q(uS)$ allocated to the selected user entity corresponds to the product of the period of the class to which the user entity was assigned, times the nominal throughput of this entity, i.e. $Q(uS)=P(cS)*D(uS)$.

The selected class remains eligible so long as the user entity selected is not the last of its class (line (10)). The virtual point in time then progresses by an amount $pV(uS)$ (line (11)) equivalent to the ratio of the quantum allocated to the sum of the nominal throughputs over the user entities (which is equivalent to the load of the resource), i.e. relation (6) which appears in Appendix IV.

This first embodiment is especially appropriate in the case where the number of requesting user entities remains constant during processing.

The case where the number of requesting entities varies during processing is described hereinbelow.

Ordinarily, the user entities which have ceased requesting are, according to a conventional approach described in particular in document [2], eliminated from every FIFO from the instant at which they become eligible again. In practice, following an item communicated by the input/output link 4, the memory link means 5 then searches systematically for any eligible user entity which has ceased requesting, so as to eliminate it from its FIFO. This involves assigning, to each entity, an "active" (requester) attribute, taking a "true" or "false" state, as proposed by the processing written out in Appendix III (a(u)=true or false).

The drawback of the conventional approach is that, in the least favourable case, the virtual deadlines of the entities may, at a given moment, all be equal. From the instant at which the virtual point in time has reached this deadline, the test which makes it possible to eliminate the entities which have ceased requesting, is performed on all the entities. Thus, the processing time is proportional to the total number of entities. This may result, in respect of the next entity to be served, in a delay which depends on this number. The objective which aims at constant processing times is not achieved in this case.

According to the second embodiment of the present invention, one refrains from eliminating a user entity which has ceased requesting, as soon as its previous deadline has been reached by the virtual point in time. Indeed, a non-requesting entity is kept in its FIFO up to the moment where it appears at the head. The processing unit 6 selects it in the guise of eligible user entity of smallest virtual deadline, and cooperates with the memory link means 5 so as subsequently to eliminate it from any FIFO.

Thus, the processing time for eliminating each non-requesting entity is independent of the total number of entities. Furthermore, regardless of the number of non-requesting entities which are eliminated when selecting a requesting entity, the service delay experienced by the latter is not greater than what it would have been if these non-requesting entities, instead of being eliminated, had formed the subject of an actual allocation of a quantum.

Moreover, the resource manager, according to this second embodiment of the invention, is contrived so as to group the newly requesting user entities into distinct classes. It thus becomes possible to overcome the difficulties related to a variation in the number of requesting entities. The resource manager distinguishes two types of classes: the classes of newly requesting user entities and the classes of user entities which were already requesting before the last allocation of a quantum (FIG. 3*b*). The deadlines of the newly requesting user entities are then determined on the basis of an internal variable of the resource manager, preferably on the basis of the virtual point in time. The entities are distributed into the classes of period P(c), but, in the example described, they retain their own virtual deadline F(u), estimated starting from their entry ("active" state true).

A structure according to a "user entities" area and a "FIFOs" area of the work memory 3 is represented in FIG. 3*b*, according to this second embodiment. The "user entities" area features, for each entity, an identifier u, its nominal throughput D(u), its virtual deadline F(u), its activation state a(u), as well as a queue-continuation item s(u). The "FIFOs of the newly requesting entities" area features, for each FIFO c, its period P(c), head of queue pun(c) and end of queue dun(c) items, and the virtual deadline Fn(c) of the head of queue entity. The head attribute pua(c) and end of FIFO attribute dua(c), the virtual deadline Fa(c) of the head entity, as well as its state of eligibility ea(c) are stored in the "FIFOs of the formerly requesting entities" area.

Of course, the invention is not limited to the embodiment described previously by way of example, it extends to other variants.

Thus, it will be understood that the number of classes managed by the device can vary according to applications. The larger the number of classes managed, the more apt are the service delays obtained.

The present invention can be applied to computer devices whose operating system shares a central processing unit between several tasks.

It can also relate to nodes of a packet switching network (nodes of "Internet" networks, etc.) which share at least one data transmission link between several information streams.

In the example described hereinabove, the allotting of the resource is done through finite processing times (time-sharing management). However, the invention applies equally to allotment by packet transmission (transmission link), the quanta then being defined by amounts of information transmitted. In general, the invention applies to allotments in service slices, the essential fact being that each queue of users is associated with a defined increment so as to count an aggregate for each user, representative of the services rendered to this user.

Moreover, the processing operations described can be simplified further. Thus, in the exemplary embodiment described, it is possible to circumvent the eligibility states. However, by introducing these states into the management of the resource, it becomes possible to avoid any disruption of the manager.

The values of increments of the virtual deadlines, as well as those of the progressions of the virtual point in time, are here defined in the case of time-sharing management, by way of example. They may be different depending on the nature of the allocations. The sign of these values of increments may moreover be negative, provided that the progression of the virtual point in time and those of the virtual deadlines move in the same direction.

The invention can be expressed in the form of the new industrial product constituted by the resource management device of the aforesaid type. It can equally be expressed in the form of the processing applied to a computer or to a network node, so as to manage the sharing of this resource.

APPENDIX I

The class identifier c and quantum value for the user entities are preferably initialized as follows:

the quanta values are restricted so as not to exceed a bound Qmax, the overall parameter of the resource manager, the class c(u) to which the entity u is assigned is defined as a function of its nominal throughput D(u) by:

| if | $P(c) = \max [P(I)]$, for i=1 to m, such that $P(i)*D(u) \leq Qmax$ |
|---|---|
| then | c(u) -c |

If for a user entity u, no class i complies with the condition $P(i)*D(u) \geq Qmax$, the parameters of the system are inconsistent. It is then advisable:

to increase the value of Qmax, or to define a class of sufficiently small period P(c), or else to increase the value D(u) of the nominal throughput of the entity u.

APPENDIX II

| Notation | |
|---|---|
| G( ) –uS, Q | Resource manager call function |
| uS | Index of the selected user entity |
| Q(uS) | Quantum allocated to the selected user entity |

APPENDIX II-continued

Notation

| | |
|---|---|
| $1, \ldots, u, \ldots, n$ | Identifiers of the N user entities |
| $1, \ldots, c, \ldots, m$ | Identifiers of the m classes of user entities |
| $P(1), \ldots, P(c), \ldots, P(m)$ | For each class of index c, value of its period $P(c)$ |
| $c(1), \ldots, c(u), \ldots, c(n)$ | For each user entity, index of its class |
| $s(1), \ldots, s(u), \ldots, s(m)$ | For each entity, identifier of the next entity in a circular list of the user entities of the same class |
| $u(1), \ldots, u(c), \ldots, u(m)$ | For each class, identifier of the entity at the head of the queue |
| $nd(1), \ldots, nd(u), \ldots, nd(m)$ | For each entity u, flag initialized to "True" if and only if it is not the last of its list |
| $F(1), \ldots, F(c), \ldots, F(m)$ | Virtual deadlines of the classes |
| $V$ | Virtual point in time of G |
| $pV(1), \ldots, pV(u), \ldots, pV(n)$ | For each entity u, progression of the virtual point in time when it is served |
| $e(1), \ldots, e(c), \ldots, e(m)$ | Eligibility states of the classes |
| FmE | Minimum virtual deadline from among those for the eligible user entities |
| FmI | Minimum virtual deadline from among those for the ineligible user entities |
| nE | Number of classes of eligible entities |
| cS | Class selected |

Processing (Initializing the loop over the classes of user entities)

$$nE=0 \text{ and } FmI=V+2^{(p-1)}-1 \quad (1)$$

(Loop over the classes of user entities)

For c=1 to m (Possible switch to the eligibility state)

$$\text{if } e(c) = \text{False}, \quad (2)$$
$$\text{and if } V \geq F(c), \text{ then } e(c) - \text{True}$$

$$\text{and } F(c) - F(c) + P(c) \quad (3)$$

(Possible updating of the number of eligible classes, possible updating of the minimum deadline of the eligible classes and of the selected class of user entities)

$$\text{if } e(c) = \text{True, then } nE - nE + 1, \quad (4)$$
$$\text{and if } nE = 1, \text{ or if } F(c) < FmE,$$
$$\text{then } cS - c \text{ and } FmE - F(c) \quad (5,6)$$

(Possible updating of the ineligible classes)
otherwise (if e(c)=False), $$\text{and if } F(c) < FmI, \text{ then } FmI - F(c) \quad (7)$$

(Updating of the selected user entity)

$$uS - u(cS), \quad (8)$$

(Updating of the variables of the selected class of user entities, eligibility of the class according to the next entity to be served)

$$u(cS) - s(uS) \quad (9)$$

$$\text{and } e(cS) - nd(uS) \quad (10)$$

(Updating of the virtual point in time)

$$pV - pV(uS)$$

$$V - V + pV \quad (11)$$

$$\text{and, if } nE=1 \text{ and } V<FmI, \text{ then } V-FmI \quad (12)$$

(End)

$$\text{return}(uS, Q(uS)) \quad (13)$$

APPENDIX III

Notation

I. User interface

| | |
|---|---|
| n | number of users |
| u | index of a user (1 to n) |
| m | number of classes |
| c | index of a class (1 to m) |
| D(u) | nominal throughput of user u |
| P(c) | period of class c |
| Selection ( ) -uS, Qus | resource manager call function in respect of selection |
| uS | index of the selected user; if no user is activated, uS = 0; the call needs to be revived, after a possible interlude |
| QuS | quantum allocated to the selected user |
| Activation (uA) | resource manager call function for activating or reactivating user uA |

2. Parameters calculated on initialization

| | |
|---|---|
| c(u) | class to which user u belongs |
| Q(u) | quantum of user u initialized to $P(c(u)) \times D/Dmax$ |
| Dmax | sum of the nominal through puts of all users |

3. Variables retained from one call to the resource manager to the next

3.1 Variables attached to the users

| | |
|---|---|
| F(u) | virtual deadline of user u (in the queue of new users, current deadline; in the queue of old users, previous deadline) |
| s(u) | user who follows user u in the queue, if it exists, which he occupies; initialized to 0, value of s(u) if u is not in any queue; s(u) = u if u is the last in the queue |
| a(u) | active state of user u, initialized to False |

3.2 Variables attached to the classes

| | |
|---|---|
| pun(c) | first user of the queue of new users of class c, initialized to 0, value of pun(c) if the queue is empty |
| dun(c) | last user of the queue of new users of class c; not relevant if pun(c) = 0 |

APPENDIX III-continued

| Notation | |
|---|---|
| Fn(c) | virtual deadline of the first user of the queue of new users of class c |
| pua(c) | first user of the queue of old users of class c, initialized to 0 |
| dua(c) | last user of the queue of old users of class c |
| Fa(c) | virtual deadline of the first user of the queue of old users of class c |
| ea(c) | eligibility state of the first user of the queue of old users of class c |

3.3 Variables attached to the resource manager set

| | |
|---|---|
| V | virtual point in time |
| D | sum of the nominal throughputs of the users present in the queues of the resource manager, initialized to 0 |

4. Variables which are not retained from one call to the resource manager to the next

| | |
|---|---|
| FmE | minimum virtual deadline from among those for the new, or eligible old, users |
| FmI | minimum virtual deadline from among those of the ineligible old users who are at the head of their queue |
| nfs | number of queues which are headed by a user liable to be selected (non-empty queues of new users and non-empty queues of old users if the latter are headed by an eligible user) |
| cS | class selected |
| tfs | type of queue selected (values: "new" or "old") |
| ca | class of the user to be activated or reactivated |
| pV | progression of the virtual point in time |

Processing of the Selection Function ( )—uS, QuS (if there is no active user, end of processing)

if D=0, then:
   return (uS=0, QuS not relevant)

(Loop over the class number; examine each of the queues so as to: (0) make eligible the users at the head of their queue who have remained ineligible although the virtual point in time has reached or exceeded their virtual deadline; (1) find the new, or eligible old, user whose virtual deadline is closest (if there is such a user), (2) count the number of queues headed by a user who is selectable, (3) determine the closest virtual deadline from among those for the ineligible old users who head their queue (if there is such a user)

```
cS-0
nfs-0
FmI-FmE-V_2^(p-1)-1
For c=1 to m
    if pun(c)≠0, then:
        nfs-nfs+1
        if Fn(c)<FmE, then: FmE-Fn(c)
        cS-c
        tfs-"new"
    if pua(c)≠0, then:
        if ea(c) = False and V>=Fa(c), then:
            ea(c)=True
            Fa(c)-Fa(c)+P(c)
        if ea(c) = False and if Fa(c)<FmI, then:
            FmI-F(c)
        if ea(c)=True, then:
            nfs-nfs+1
            if Fa(c)<FmE, then: FmE-Fa(c)
            cS-c
            tfs-"old"
End for
(updating of the variables of the class and of the
selected user)
if tfs="new", then:
    uS-pun(cS)
    pun(cS)-s(uS)
    if pun(cS)=uS, then: pun(cS)-0 nfs-nfs-1
    otherwise: Fn(cS)-F(pun(cS))
otherwise:
    uS-pua(cS)
    pua(cS)-s(uS)
    if pua(cS)=uS, then: pua(cS)-0 nfs-nfs-1
    otherwise:
        Fa(cS)-F(pua(cS))
        if V<Fa(cS), then:
            ea(c)-false
            nfs-nfs-1
```

(if the selected user is activated, placement of the latter at the end of the queue of old users of his class and deactivation)

```
if a(uS)=True, then:
    if pua(cS)=0, then: pua(cS)-uS
    if dua(cS)≠0, then: s(dua(cS))-uS
    dua(cS)=uS
    s(uS)-uS
    if F(uS)<FmI, then: FmI=F(uS)
    a(uS)-False
```

(if the selected user is not activated, elimination of the latter from every queue, then return to a new selection)

```
otherwise (that is to say if a(uS)=False):
    u(uS)-0
    D-D-D(u)
    if nfs=0 and V<FmI and D>0, then V-FmI
    return to the start of processing
```

(updating of the virtual point in time)

QuS-Q(uS)

pV-QuS*Dmax/D

V-V+pV if *nfs*=0 and *V<FmI*, then *V-FmI*

(end)

Return (uS, QuS)

Processing of the Activation Function (uA)

(if the user is already in a queue of the resource manager, storage of his reactivated stated and end)

if s(uA)≠0, then:
  a(u)—True
  Return ( )

(calculation of the virtual deadline of uA)

ca–c(uA)

F(uA)–V+P(ca)

(placing of uA at the end of the queue of new users of his class)

if pun (cA)=0, then:

pun(cA)–uA

Fn(ca)–F(uA)

otherwise (that is to say if pun≠0), then:

s(dun(cA))–uA $dun(cA)=uA$ (uA)–uA (end)
Return ( )

APPENDIX IV (1) $$\gamma(t) = \sum_{k=1}^{k=N} D(k)$$

(2) $$Q_i(t) = \int_{d(t)_i}^{f(t)_i} \frac{d\tau}{\gamma(t)}$$

(3) $$q(t) = \int_{t(t)_0}^{t} \frac{d\tau}{\gamma(\tau)}$$

(4) $$E_1(t) = q(f_i(t))$$

(5) $$E_i(t) = q(d_i(t)) + \frac{Q_i}{D_i}$$

(6) $$pV(uS) = Q(uS) \bigg/ \sum_{k=1}^{N} D(k)$$

The invention claimed is:

1. A device for shared management of a resource between several users, comprising:
  a memory for storing virtual deadlines ($E_i$) and share parameters ($D_i$) associated with respective user-identifiers each ($u_i$), of the user-identifiers ($u_i$) representing one of the users, the memory further storing values of increments (P(c));
  a plurality of classes, each class being associated with a respective one of the values of increments (P(c)) stored in the memory;
  a plurality of first-in-first-out (FIFO) queues for storing the user-identifiers ($u_i$) of the users, each FIFO being assigned to one of the plurality of classes and being associated with one of the values of increments (P(c)) of one of the plurality of classes; and
  a processing unit coupled to the memory and the FIFO queues, wherein the processing unit is configured to:
    select a user-identifier ($u_s$) of one of the FIFO queues, the selected user-identifier ($u_s$) being at a head of the one of the FIFO queues and having the least advanced virtual deadline ($E_s$) among the stored virtual deadlines;
    allocate to the user represented by the selected user-identifier ($u_s$) a service slice ($Q_s$) of the resource, the service slice ($Q_s$) being derived from the values of the share parameters ($D_s$) associated with the selected user-identifier ($u_s$) and of the increment (P(c)) of the FIFO in which the selected-identifier ($u_s$) is stored; and
    increase the virtual deadline ($E_s$) associated with the selected user-identifier ($u_s$) according to a value of increment ($dE_s$), wherein the service slice ($Q_s$) allocated to the user represented by the selected user-identifier ($u_s$) results from a formula $Q_s=P(c)\times D_s$.

2. The device according to claim 1, wherein the processing unit is further configured to:
  maintain a virtual point in time (V) managed by the device;
  increase the virtual point in time (V) by an increment value (pV) for advancing the virtual point in time (V); and
  allow allocation of the service slice ($Q_s$) to the user represented by the selected user-identifier ($u_s$) as long as the virtual deadline ($E_s$) associated to the selected user-identifier ($u_s$) is less advanced than the virtual point in time (V).

3. The device according to claim 2, wherein the virtual point in time (V) is increased by the increment value (pV) for each allocation to the user represented by the selected user-identifier ($u_s$) of the service slice ($Q_s$) of the resource, the increment value (pV) being a quotient of the increment (P(c)) of the FIFO queue in which the selected-identifier ($u_s$) is stored and a sum of the share parameters ($D_i$).

4. The device according to claim 1, wherein the memory comprises:
  a FIFO queues area storing, for each of the FIFO queues, one of the values of the increments (P(c)) and the user-identifier ($u_s$) of the user at the head of the FIFO queue; and
  a users area storing, for each user, the user-identifiers ($u_i$), the share parameters ($D_i$), and an end of queue item (nd(u)).

5. The device according to claim 4, wherein FIFO queues are cyclic queues defining circular lists, and wherein each of the FIFO queues associates a single virtual deadline (F(c)) to the user-identifiers ($u_i$) stored in the FIFO queue, said single virtual deadline (F(c)) being stored in the FIFO queues area.

6. The device according to claim 5, wherein the processing unit is further configured to:
  allocate to the user represented by the selected user-identifier ($u_s$) the service slice ($Q_s$) of the resource, the selected user-identifier ($u_s$) being in the list having the least advanced virtual deadline (F(c)); and
  increase the virtual deadline (F(c)) of said list after allocating a service slice ($Q_c$) to a user at the end of said list.

7. The device according to claim 1, wherein users requesting a service slice of the resource are distinguished from users not requesting a service slice of the resource.

8. The device according to claim 7, wherein user-identifiers of newly requesting users and user-identifiers of formerly requesting users are stored in distinct FIFO queues.

9. The device according to claim 8, wherein a virtual deadline (F(u)) is assigned to the user-identifiers ($u_i$) of a newly requesting user, the virtual deadline (F(u)) being dependent on a virtual point in time (V) managed by the device.

10. The device according to one of the claims 7 to 9, further configured to eliminate non-requesting users appearing at the head of one of the FIFO queues.

11. The device according to claim 10, wherein a non-requesting user is eliminated when said non-requesting user is allowed to use a resource and possesses the least advanced virtual deadline (F(u)) among the stored virtual deadlines.

* * * * *